United States Patent
Akutsu et al.

[11] Patent Number: 5,822,292
[45] Date of Patent: Oct. 13, 1998

[54] MULTI BEAM TRACK SYSTEM AND METHOD FOR AN OPTICAL MEMORY

[75] Inventors: Nakao Akutsu, Shimotsuma; Yasuaki Morimoto, Sakura; Yoshiharu Chikazawa, Yokohama; Akira Kawamura, Hachiouji, all of Japan

[73] Assignee: Thomson multimedia S.A., Courbevoie, France

[21] Appl. No.: 642,324

[22] Filed: May 3, 1996

[30] Foreign Application Priority Data

May 6, 1995 [GB] United Kingdom ............... 9509306

[51] Int. Cl.$^6$ ............................... G11B 7/00; G11B 3/74
[52] U.S. Cl. .............................. 369/112; 369/110; 369/95
[58] Field of Search ......................... 369/100, 109, 369/110, 112, 44.37, 93, 95, 44.38

[56] References Cited

U.S. PATENT DOCUMENTS

| | | | |
|---|---|---|---|
| 4,607,359 | 8/1986 | Matsubayashi et al. | 369/110 X |
| 5,144,616 | 9/1992 | Yasukawa et al. | 369/112 X |
| 5,202,860 | 4/1993 | Takahashi et al. | 369/110 X |
| 5,260,927 | 11/1993 | Higashihara et al. | 369/110 |
| 5,289,313 | 2/1994 | Matsuoka | 369/110 X |
| 5,353,274 | 10/1994 | Nishikawa | 369/110 X |
| 5,483,511 | 1/1996 | Jewell et al. | 369/112 X |
| 5,526,338 | 6/1996 | Hasman et al. | 369/112 X |
| 5,528,576 | 6/1996 | Nishikawa | 369/110 X |

FOREIGN PATENT DOCUMENTS

| | | | |
|---|---|---|---|
| 0478163 | 4/1992 | European Pat. Off. | G11B 7/135 |
| 0539128 | 4/1993 | European Pat. Off. | G11B 11/10 |

*Primary Examiner*—Paul W. Huber
*Attorney, Agent, or Firm*—Joseph S. Tripoli; Frederick A. Wein

[57] ABSTRACT

A multi beam track system and method is used for the retrieving of information stored in optical memories like optical disks. The information carrying beams reflected on the surface of such a optical disk results in spots on the surface of a detector array. Because these beams are very close to each other, the resulting spots tend to overlap so that cross talk conditions between neighboring channels occur. As result the S/N ratio becomes worse. According to the present invention a plurality of laser beams arranged in a row is used, where the laser beams are linear polarized and the polarization of neighboring beams differ by 90ø, i.e. neighboring laser beams have perpendicular linear polarization. After reflection on the surface of the optical disk the row of reflected laser beams is separated into two rows by an separating means which is polarization dependent so that beams are separated in space according to the polarization. Such a separator can be a polarizing beamsplitter or a birefringent prism crystal. As a result two spacially separated rows of laser beams are achieved, which can be detected by two separate detectors. As result no overlap between neighboring spots occurs on the surface of the detectors, resulting in the elimination of crosstalk.

28 Claims, 4 Drawing Sheets

MULTI BEAM TRACK SYSTEM AND METHOD FOR AN OPTICAL MEMORY

The present invention relates to a multi beam track system and to a method for regaining information of an optical memory, for example by reflection of the multi light beam from an optical memory disk.

For storing and retrieving vast amounts of a digital data so-called optical disks are used which can be in a form of read only memory like e.g. CD ROM or digital video disc (DVD), or an erasable, rewritable optical disk. Usually such disks comprise a plurality of circular tracks, on which the digital information is stored. A laser beam is directed onto such track and the digital information is retrieved from the outgoing beam which is usually reflected from the surface of the optical disk. In order to enhance the access to the stored digital data it is either possible to increase the linear velocity of the disk or to use a multi track system, which means that a plurality of tracks is read simultaneously by a plurality of light beams.

The known systems show the following disadvantages:

If the linear velocity of the disk get higher the jitter becomes worse (signal-to-noise ratio (S/N) deteriorate) and the focussing and tracking servo becomes difficult and complicated. On the other hand, in multi track system using a plurality of light beams, it is difficult to separate the reflected (or transmitted) outgoing plurality of light beams. For this reason the cross talk becomes worse.

It is therefore an object of the present invention to provide a multi beam track system and method for retrieving information of an optical memory wherein it is possible to sufficiently separate the outgoing information carrying beams and to avoid cross talk between neighboring channels or tracks.

The multi beam track system for an optical memory according to the invention comprises a multi beam generating means for generating a plurality of light beams, a separating means for separating the outgoing information carrying beams and detection means for detecting the outgoing beams.

Neighboring light beams can differ e.g. by different polarizations and/or different wavelengths. Therefore, it is possible to use a separating system for the outgoing information carrying beams, which separates these beams according to their polarization and/or to their wavelength. This separating means can for example refract the beams according to the polarization and/or to the wavelength. Further separating means which depend on other principles like birefringence are possible.

Usually, a linear polarization of the light beams which will in most appliances be laser beams, will be used, where the polarization of neighboring beams will be different by 90°, i.e. neighboring beams will be perpendicularly linear polarized.

It is further possible that the degree of polarization changes from one beam to the neighboring beam by a fixed amount dphi different from 90°.

Furthermore, the light beams could be circularity polarized, so that from two neighboring beams one has a right and the other a left hand circular polarization.

Such a plurality of laser beams is usually generated by a laser diode array arranged in a row.

The information carrying outgoing beam, usually reflected from the information carrying side of an optical disk, is directed to a separating means, which responds to the different polarizations of the laser beams. With the different polarization of neighboring beams it is possible to spacially separate the reflected beams. For example with the usage of perpendicular polarized beams the use of a polarizing beamsplitter separates the outgoing beams into two rows of beams, which are spacially arranged perpendicular to each other. The reason for that is that one polarization gets reflected at the beamsplitter's oblique plane while the other polarization passes the beamsplitter in the incident direction. Therefore an overlap of neighboring beams on the respective detection surface does not occur, which avoids cross talk between neighboring channels.

Another possibility to separate the different polarizations is the use of birefringence or optical anisotropy, especially the use of a birefringent prism crystal, where the amount of refraction depends on the polarization. Therefore optical anisotropy can in principle be used in the case where the polarization of neighboring beams changes by an angle dphi, for example 45°.

Well known means, like filters, can be used for a separation in different wavelengths.

Further, the method according to the invention for reading an optical memory means by a multi beam track system comprises the following steps:

generating a plurality of light beams, preferable in row, wherein neighboring light beams have a different polarity, directing said plurality of light beams on the optical memory means, separating the reflected beams with a polarization dependent separating means, and detecting the outgoing information carrying beams with a detection means.

Further preferred embodiments of the invention are given in the subclaims.

Preferred embodiments of the invention are described in the following figures, in which FIGS. 1A+1B show the principles of a multi track optical memory system;

Figure 1A:
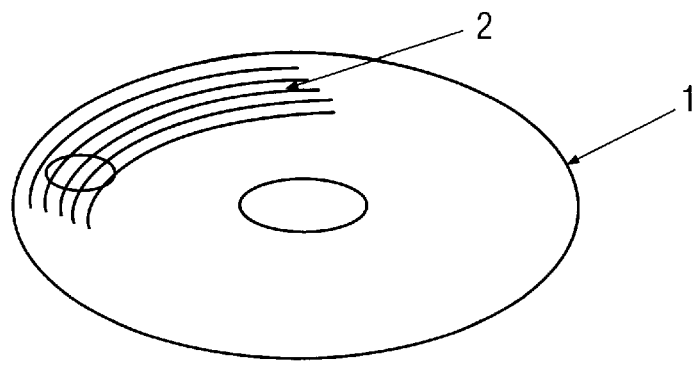
Figure 1B:
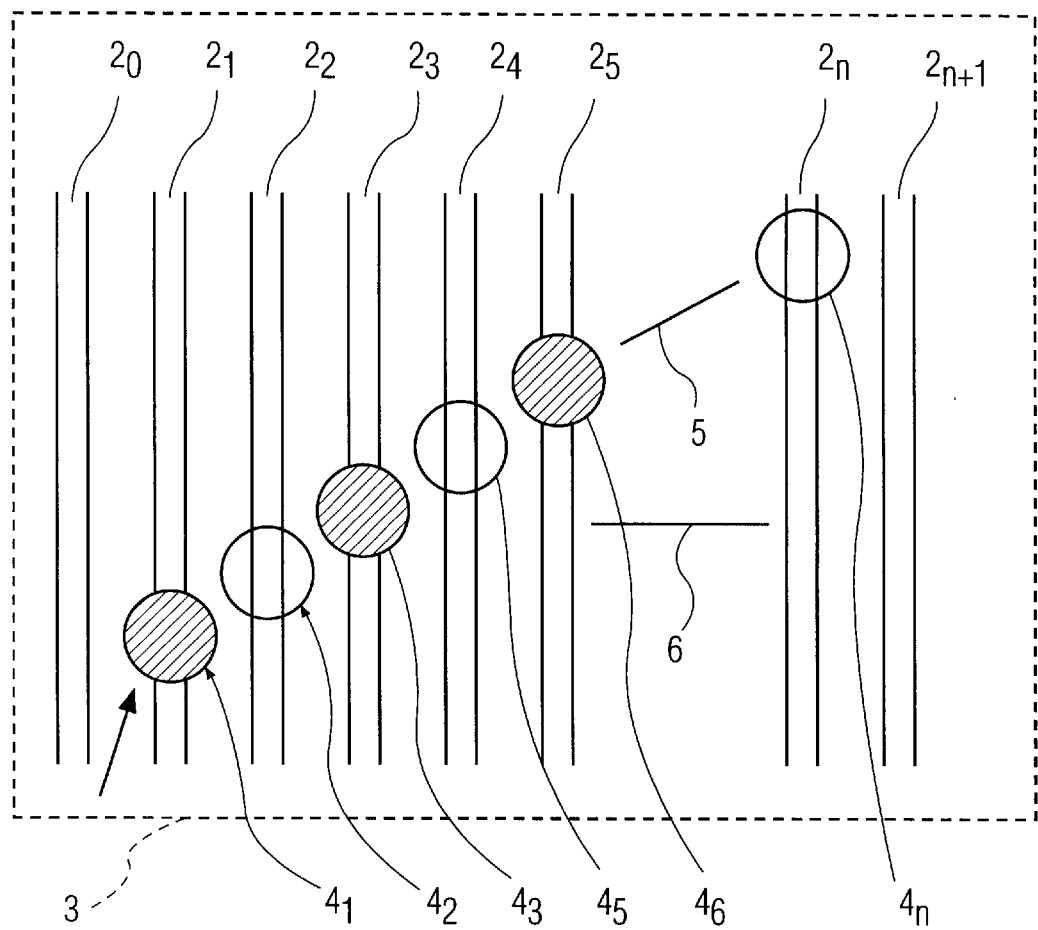

FIG. 1 includes the FIGS. 1a and 1b.

FIG. 1a shows a concentrical disk 1 with a multiplicity of concentrical tracks 2. These tracks are read in an area 3 of the optical disk 1 by a plurality of light beams (not shown).

FIG. 1b shows an enlarged view of the area 3 to be read (see also FIG. 1a), where the tracks 2 are shown as being parallel for explanation purposes. These tracks ($2_0$–$2_{n+1}$) are irradiated by laser light spots ($4_1$–$4_n$) of the plurality of light beams, respectively. As can be seen in FIG. 1b the spots $4_1$–$4_n$ of the plurality of beams consisting of n laser beams are arranged in a straight line, which is oblique to the direction of the tracks $2_0$–$2_{n+1}$. The full drawn dots (i.e. those with odd indices) have in this example a vertical polarization, while those dotted spots (grey scaled with the even indices) have in this example a horizontal linear polarization.

It is possible that the polarization does not necessarily differ by 90°, but that it differs by an angle of 45°, which means that the polarization changes from each dot to the next one by an angle of 45°. Further, it is possible that for example the spots with the odd indices are right handed circular polarized and those with the even indices are left handed circular polarized.

It is usual that the row line 5 connecting the spots is inclined relative to the radius 6 of the disk so that the light spots $4_1$ to $4_n$ on the tracks $2_1$–$2_n$ does not overlap.

Figure 2:
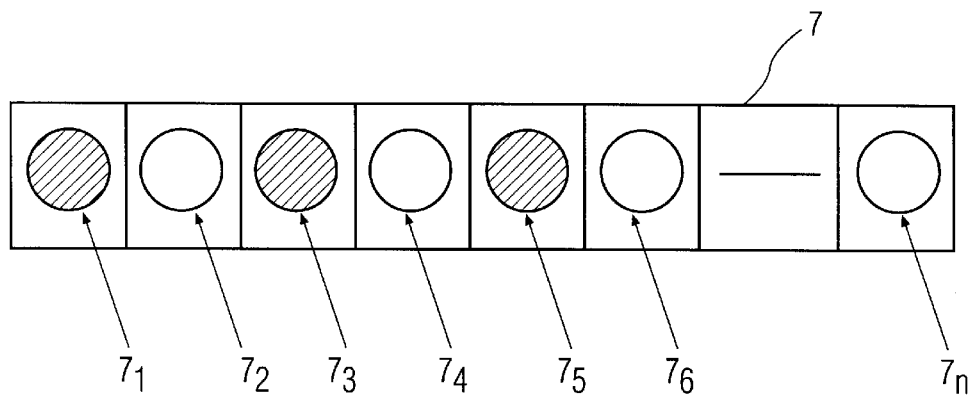
FIG. 2 shows an example of a laser diode array.

FIG. 2 shows a laser diode array 7, which can be used in a multi track system. This laser diode array 7 consists of a plurality of laser diodes $7_1$–$7_n$, which are arranged in a straight row. The laser diode array 7 used in this invention consists of n small laser diodes with alternating linear polarity where n is a natural number.

Figure 3:
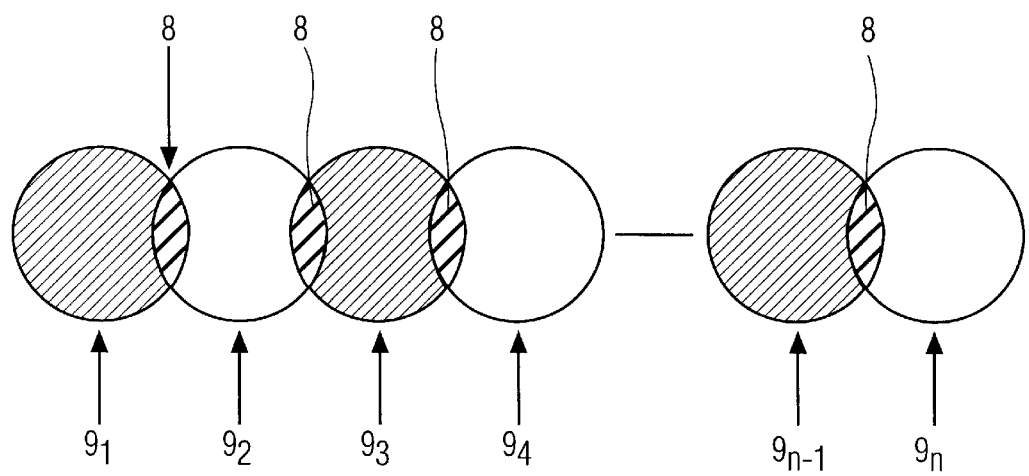
FIG. 3 shows the overlap of the reflected beams on a detector without the separation according to their polarization.

FIG. 3 shows the overlap 8 of spots $9_1$ to $9_n$ of the respective laser beams on a detector array. Because of the reflection of the laser beams on the tracks of an optical disk the size of spots change so that on a detector array the spots $9_1$ to $9_n$ of the various light beams tend to overlap with overlap areas 8. This leads to an undesired cross talk and a decrease in the S/N ratio. These disturbance problems would not occur, if either the beam spots would be better separated or, for example, every second beam spot would be sent to another spacial position.

Figure 4:
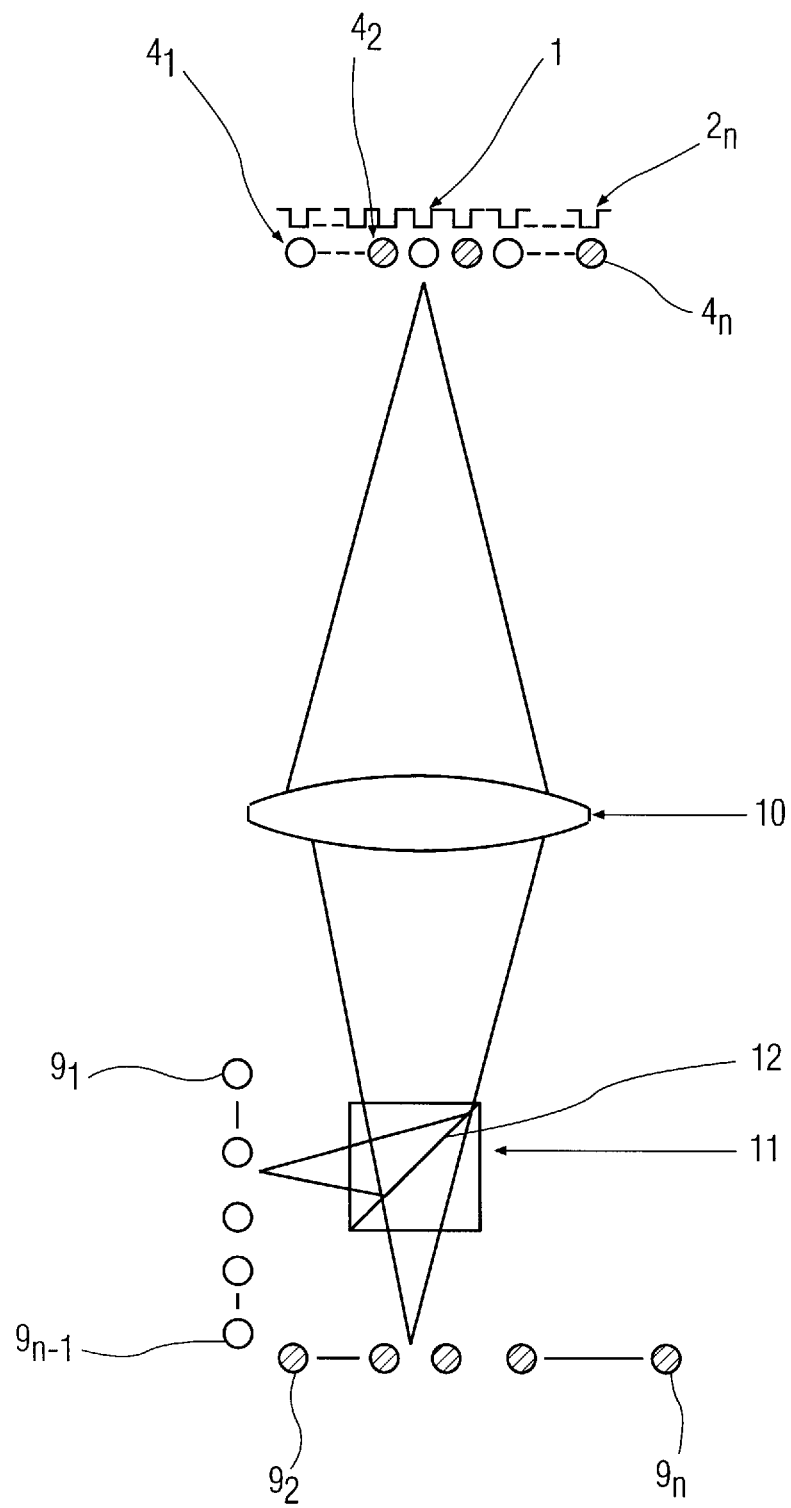
FIG. 4 shows one embodiment of the invention using linear polarized light beams and a polarizing beamsplitter.

FIG. 4 shows the first embodiment to the multi beam separating system. Laser beam spots $4_1$ to $4_n$ are incident on tracks $2_1$–$2_n$ of an optical disk 1. The laser beams corresponding to the spots $4_1$–$4_n$ are alternating their linear polarization by 90°. The beams reflected by the optical disk are collimated by a lens 10 and directed onto a polarizing beamsplitter 11 which has the property that those beams with vertical linear polarity (i.e. those with odd indices) are reflected on the 45° plane 12 of the beamsplitter while those beams with vertical polarization (i.e. those with even indices) are transmitted through the beamsplitting plane 12. As a result two rows of information carrying spots $9_1$ to $9_{n-1}$ (i.e. those with the odd indices) and $9_2$ to $9_n$ (those with the even indices) are achieved, which are separated in space. Therefore, it is possible to direct the row with the spots of horizontal polarization to one detector array, while the row with the respective vertical polarization is directed to another detector array.

Figure 5:
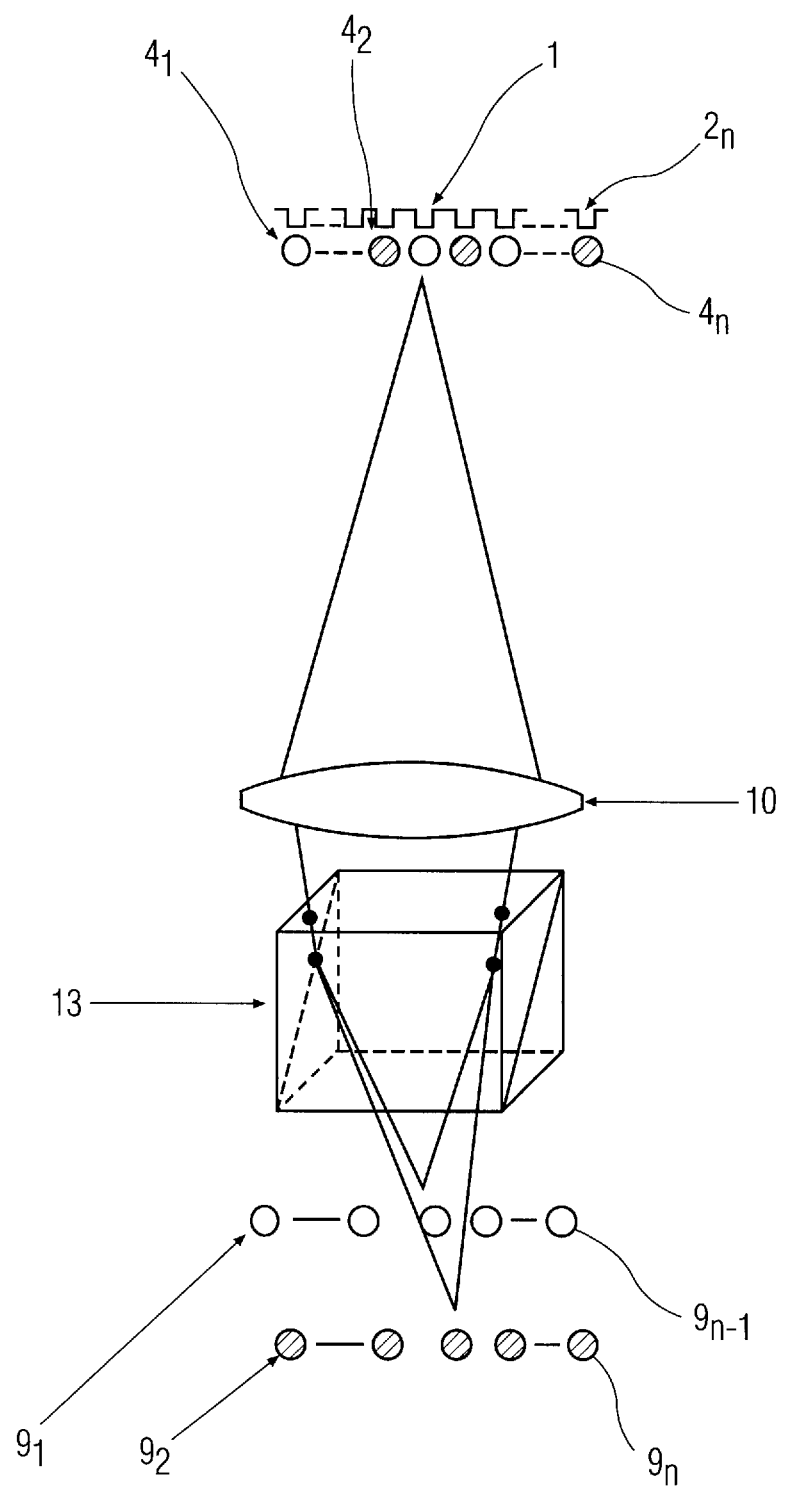
FIG. 5 shows a further embodiment of the invention using birefringent prism crystal.

FIG. 5 shows a second embodiment of a multi beam separating system. Like in FIG. 4 the plurality of laser beams with differing polarizations $4_1$–$4_n$ is directed to respective tracks $2_1$–$2_n$ on a disk 1. The reflected beam is collimated by a lens 10 and directed onto a birefringent prism crystal, where the reflection angle of the different polarizations is a function of birefringence of the crystal. These birefringence leads to a spacial separation of the row of beams into two separated rows $9_1$ to $9_{n-1}$ and $9_2$ to $9_n$ according to the polarization of the laser beams. Because in each row every second spot is missing no cross talk occurs between neighboring tracks. The information is detected by two separate rows of detector arrays (not shown).

we claim:

1. Multi beam track system for an optical memory comprising:
    a multi beam generating means for generating a plurality of light beams for reading information stored in the optical memory by simultaneously reading a plurality of tracks, and
    a detecting means for detecting the outgoing information carrying beams,
    further comprising:
        a separating means for separating the outgoing information carrying beams
        wherein neighboring light beams have a different polarization.

2. Multi beam track system according to claim 1, wherein the beams are linearily polarized.

3. Multi beam track system according to claim 2, wherein the polarization of neighboring beams differ by an angle of dphi.

4. Multi beam track system according to claim 3, wherein the polarization angle of neighboring beams differ by 90°.

5. Multi beam track system according to claim 1, wherein the light beams are circularity polarized.

6. Multi beam track system according to claim 1 wherein the light beams are laser beams.

7. Multi beam track system according to claim 6, wherein the plurality of laser beams is generated by a laser diode array.

8. Multi beam track system according to claim 1 wherein the information carrying light emanating from the optical memory means is separated by said separation means according to the polarization of the information carrying beams.

9. Multi beam track system according to claim 8, wherein the separation means spatially separates the information carrying beams.

10. Multi beam track system according to claim 9, wherein the separation means include a polarizing beamsplitter.

11. Multi beam track system according to claim 9, wherein the separation means include a birefringent means.

12. Multi beam track system according to claim 11, wherein the birefringent means is a birefringent prism crystal.

13. Multi beam track system according to claim 1 wherein the information carrying beams are reflected from a surface of an optical memory disk.

14. Method for regaining information stored in an optical memory means using a multi beam track system, comprising the steps of:
    generating a plurality of light beams, wherein neighboring light beams have different polarization;
    directing the plurality of light beams onto the optical memory means whereby a plurality of tracks is scanned simultaneously;
    separating the outgoing, information carrying light beams according to their polarization by a separating means, and
    detecting the separated outgoing beams by a detection means.

15. Method according to claim 14, wherein said light beams are arranged in a row.

16. Method according to claim 14 wherein said light beams are laser beams.

17. Method according to claim 14 wherein the polarity of neighboring beams differ by an angle dphi.

18. Method according to claim 17, wherein the angle dphi is 90°.

19. Method according to claim 14, wherein said light beams are circularity polarized.

20. Method according to claim 14 wherein the information carrying outgoing laser beams are spacially separated.

21. Method according to claim 20, wherein said separating means is formed by a polarizing beamsplitter.

22. Method according to claim 20 wherein said separating means is formed by a birefringent means.

23. Method according to claim 22 wherein the birefringent means is a birefringent prism crystal.

24. Method according to claim 14 wherein said plurality of laser beams is reflected from the surface of an optical memory disk.

25. A multi beam track system for an optical memory comprising a multi beam generating means for generating a plurality of light beams for reading information stored in the optical memory by simultaneously reading a plurality of tracks, and a detecting means for detecting the outgoing information carrying beams, and a separating means for separating the outgoing information carrying beams, wherein neighboring light beams have a different wavelength.

26. A multi beam track system according to claim 25, wherein neighboring light beams have a different wavelength.

27. A method for regaining information stored in an optical memory means using a multi beam track system, comprising the steps of:

generating a plurality of light beams, wherein neighboring light beams have different wavelength;

directing the plurality of light beams onto the optical memory means whereby a plurality of tracks is scanned simultaneously;

separating the outgoing, information carrying light beams according to wavelength by a separating means, and detecting the separated outgoing beams by a detection means.

28. A method according to claim 27, wherein neighboring light beams have a different wavelength.

* * * * *